United States Patent [19]
Mikitenko et al.

[11] Patent Number: 5,817,227
[45] Date of Patent: Oct. 6, 1998

[54] PROCESS FOR THE SELECTIVE REDUCTION TO THE CONTENT OF BENZENE AND LIGHT UNSATURATED COMPOUNDS IN A HYDROCARBON CUT

[75] Inventors: Paul Mikitenko, Noisy le Roy; Christine Travers, Rueil Malmaison; Jean Cosyns, Maule; Charles Cameron, Paris; Jean-Luc Nocca, Rueil Malmaison; Françoise Montecot, Les Clayes Sous Bois, all of France

[73] Assignee: Institut Francais du Petrole, France

[21] Appl. No.: 774,927

[22] Filed: Dec. 27, 1996

[30]         Foreign Application Priority Data

Dec. 27, 1995  [FR]  France ................................. 95/15.531

[51] Int. Cl.⁶ .................................................. C01G 45/00
[52] U.S. Cl. .......................... 208/143; 208/144; 585/264; 585/265
[58] Field of Search ..................... 208/143, 144; 585/264, 265

[56]              References Cited

U.S. PATENT DOCUMENTS

| | | | |
|---|---|---|---|
| 4,469,907 | 9/1984 | Araki et al. ............................. | 208/143 |
| 4,503,265 | 3/1985 | Schleppinghoff et al. ............. | 568/697 |
| 4,648,959 | 3/1987 | Herber et al. ........................... | 208/143 |
| 4,960,960 | 10/1990 | Harrison et al. ........................ | 585/265 |
| 5,177,283 | 1/1993 | Ward ........................................ | 585/446 |
| 5,210,348 | 5/1993 | Hsieh et al. ............................. | 208/143 |

FOREIGN PATENT DOCUMENTS 0 552 069   7/1993   European Pat. Off. .
0 552 070   7/1993   European Pat. Off. .

*Primary Examiner*—Walter D. Griffin
*Assistant Examiner*—Nadine Preisch
*Attorney, Agent, or Firm*—Millen, White, Zelano & Branigan, P.C.

[57]              ABSTRACT

The invention is concerned with a process for treating a charge of which the major part is constituted by hydrocarbons comprising at least 5 carbon atoms per molecule and comprising at least one unsaturated compound comprising at the most six carbon atoms per molecule including benzene, such that said charge is treated in a distillation zone, comprising a drainage zone and a stripping zone, associated with a hydrogenation reaction zone, comprising at least one catalytic bed, in which hydrogenation is carried out of at least part of the unsaturated compounds comprising at the most six carbon atoms per molecule and contained in the charge, the charge of said reaction zone being removed at the height of a removal level and representing at least a part of the liquid flowing in the distillation zone, the effluent of the reaction zone being at least partly reintroduced into the distillation zone, in such a way as to ensure the continuity of the distillation operation and in such a way as to remove from the top of the distillation zone an effluent with a very depleted content of unsaturated compounds comprising at the most 6 carbon atoms per molecule, and at the bottom of the distillation zone an effluent with a depleted content of unsaturated compounds comprising at the most six carbon atoms per molecule, said process being characterized in that the hydrogenation zone is at least partly outside the distillation zone.

23 Claims, 3 Drawing Sheets

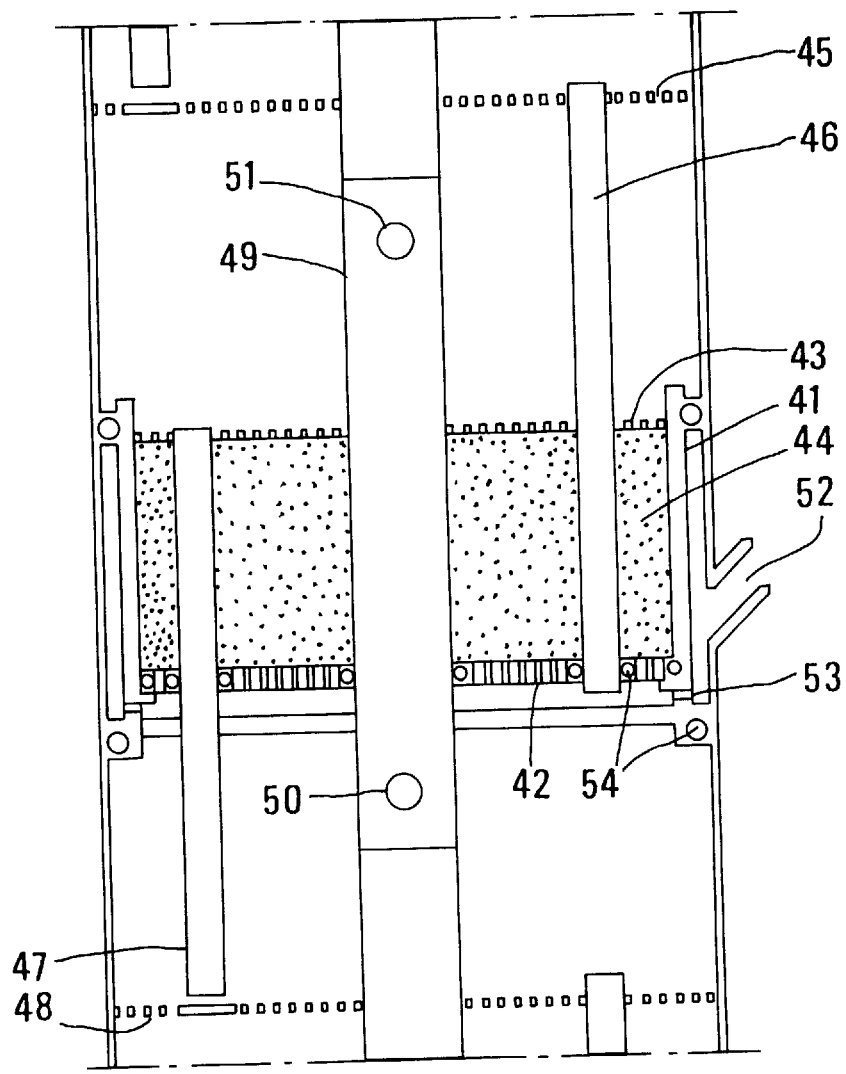

PROCESS FOR THE SELECTIVE REDUCTION TO THE CONTENT OF BENZENE AND LIGHT UNSATURATED COMPOUNDS IN A HYDROCARBON CUT

BACKGROUND OF THE INVENTION

The invention is concerned with a process for the selective reduction to the content of light unsaturated compounds (that is to say compounds containing at the most six carbon atoms per molecule) including benzene, from a hydrocarbon cut which comprises mainly at least 5 carbon atoms per molecule, without any significant loss to the octane number, said process comprising passing said cut into a distillation zone associated with a hydrogenation reaction zone, said process being characterised in that the hydrogenation zone is at least partly outside the distillation zone.

In view of the acknowledged toxicity of benzene and olefins, unsaturated compounds, the general tendency is to reduce the content of these constituents in petrols.

Benzene has carcinogenic properties, and it is therefore necessary to restrict to a maximum any possible pollution of the ambient air, in particular by excluding it in practice from car fuel. In the United States, reformulated fuels must contain no more than 1% benzene; in Europe, even though the requirements are not yet as strict, recommendations are gradually veering towards this value.

It has been acknowledged that olefins are among the most reactive hydrocarbons in the cycle of photochemical reactions with nitrogen oxides occurring in the atmosphere and resulting in ozone formation. An increase in the concentration of ozone in the air can be the cause of respiratory problems. It is therefore desirable to reduce the content of olefins in petrols, and, more particularly, the content of the lightest olefins which are most likely to become volatile when fuel is being processed.

The benzene content of a petrol is very largely dependent on that of the reformate component of that petrol. The reformate results from a naphtha catalytic treatment, the aim of which is to produce aromatic hydrocarbons comprising mainly from 6 to 9 carbon atoms in their molecule and whereof the very high index number imparts antiknock properties to the petrol. As a result of the toxicity mentioned hereinabove, maximum reduction to the benzene content of the reformate is therefore necessary. Several methods can be envisaged.

A first method consists in limiting the content of benzene precursors, such as cyclohexane and methylcyclopentane in the naphtha constituting the charge of a catalytic reforming unit. This solution is effective in permitting a substantial reduction to the benzene content in the effluent of the reforming unit but is not enough by itself when it is a question of reducing the content to as little as 1%. A second method consists in eliminating, by distillation, a light fraction from the reformate containing benzene. This solution results in a loss in the order of between 15 and 20% of the hydrocarbons which would be valorisable in petrols. A third method consists in extracting the benzene present from the effluent of the reforming unit. Several known techniques are applicable in theory: extraction using solvent extractive distillation, adsorption. None of these techniques is used on an industrial scale because none of them permits economical selective extraction of the benzene. A fourth method consists in the chemical conversion of the benzene into a constituent free from legal restrictions. Alkylation using ethylene converts the benzene mainly into ethylbenzene, for example. However, this operation is tedious because of the intervention of secondary reactions which require separation operations which are costly in terms of energy.

The benzene in a reformate can also be hydrogenated into cyclohexane. Since selective hydrogenation of the benzene is impossible in a mixture of hydrocarbons which also contains toluene and xylenes, it is therefore necessary to first of all fractionate that mixture in order to isolate a cut which contains only benzene and which can thus undergo hydrogenation.

A process has also been described wherein the hydrogenation catalytic zone of the benzene is inside the stripping zone of the distillation column which separates the benzene from the other aromatics (Benzene Reduction—Kerry Rock and Gary Gildert CDTECH—1994 Conference on Clean Air Act Implementation and Reformulated Gasoline—October 94), which permits savings in respect of apparatus. It has been seen that the loss of charge through the catalytic bed(s) according to said process means that it is not possible to obtain a thorough mixture of the liquid phase and gaseous phase containing hydrogen. Indeed, according to this type of technology where the reaction and distillation take place simultaneously in the same physical space, the liquid phase descends through any catalytic bed in the reaction zone with a dripping flow behaviour, thus being in thin streams of liquid. The gaseous fraction containing the fraction of vaporised charge and the gaseous flow containing the hydrogen rise through said catalytic bed in the columns of gas. By virtue of this arrangement, the entropy of the system is high and the loss of charge through the catalytic bed(s) is low. Consequently, the mode of operation in accordance with this type of technology does not easily make it possible to promote dissolution of the hydrogen in the liquid phase comprising the unsaturated compound(s).

The Patent U.S. Pat. No. 4,503,265 describes a process for the production of MTBE comprising drawing off from a distillation column a cut containing isobutene and methanol, the passage of the cut in a reactor containing a cationic exchange acid catalyst, the reaction of isobutene and methanol for generating MTBE and reinjection of the reaction effluent into the column. The heavy product, MTBE, is separated at the bottom of the column, and the raffinate which has a depleted isobutene content is separated at the top of the column. Said patent is therefore concerned with displacing a balanced reaction by separating the product, MTBE, and reactants, methanol and isobutene.

Patent Applications WO 93/19031 and WO 93/19032 describe processes for the production of MTBE comprising means similar to those described in the patent U.S. Pat. No. 4,503,265.

The patent U.S. Pat. No. 5,177,283 describes a process for the conversion of hydrocarbons which comprises passing the charge into a fractionation zone, the effluent at the top being rich in one of the reactants and the effluent at the bottom being rich in the reaction product, lateral drawing off of a liquid flow which is passed with a gaseous flow rich in hydrogen into a catalytic reaction zone to permit the production of an effluent comprising one of the reactants and the reaction product a fraction of the gaseous part of said effluent being recycled to the reaction zone, the liquid part of said effluent being sent back to the fractionation zone, usually in proximity to the drawing off stage. No mention is made of the hydrogenation reaction of benzene and of any other unsaturated compound comprising at the most six carbon atoms per molecule which is a total reaction in comparison with all the reactions mentioned in said patent which are balanced reactions. No mention is made, either, of reactions producing one (or more) reaction product(s) with boiling points lower than and/or almost identical to the boiling points of the reactants. In this case, the products of the reaction(s) can be at least partly in the fraction issuing from the top of the column.

SUMMARY OF THE INVENTION

The process according to the invention permits the cost-effective production from a crude reformate of a reformate with a depleted content of benzene, or, if necessary, almost completely purified of benzene and also of other unsaturated hydrocarbons containing at the most six carbon atoms per molecule, such as light olefins, without any significant loss in yield, and with very little loss to, or with an increase in, the octane number. The process according to the invention is characterised by the integration of two operations, namely the distillation operation and hydrogenation operation which are arranged and carried out in such a way as to minimise the cost of the process and to maximise the hydrogen conversion, whilst maximising the yield of distillate and residue issuing from the column, with a suitable benzene content. In this way, the process according to the invention carries out at least partial selective hydrogenation of benzene and of any unsaturated compound comprising at the most six carbon atoms per molecule and different from benzene, which may be present in the charge, whilst restricting the hydrogenation of $C_7^+$ compounds (that is to say compounds having at least seven carbon atoms per molecule).

The process according to the invention is a process for treating a charge whereof the major part is constituted by hydrocarbons comprising at least 5, preferably between 5 and 9, carbon atoms per molecule, and comprising at least one unsaturated compound comprising at the most six carbon atoms per molecule including benzene, and possibly and preferably at least one olefin, such that said charge is treated in a distillation zone, comprising a drainage zone and a stripping zone, associated with a hydrogenation reaction zone, comprising at least one catalytic bed, in which the hydrogenation is carried out of at least part of the unsaturated compounds comprising at the most six carbon atoms per molecule, that is to say comprising up to six (inclusive) carbon atoms per molecule, and contained in the charge, in the presence of a hydrogenation catalyst and a gaseous flow comprising, preferably a major part, of hydrogen, the charge of the reaction zone being removed at the height of a removal level, and representing at least a part, preferably the major pal, of the liquid flowing in the distillation zone, preferably flowing in the stripping zone, and still more preferably flowing at an intermediate level of the stripping zone, part of the effluent of the reaction zone, preferably a major part, being reintroduced into the distillation zone at the height of at least one reintroduction level, in such a way as to ensure the continuity of the distillation operation, and in such a way finally as to remove from the top of the distillation zone an effluent with a very depleted content of unsaturated compounds comprising at the most six carbon atoms per molecule, and at the bottom of the distillation zone an effluent with a depleted content of unsaturated compounds comprising at the most six carbon atoms per molecule, said process being characterised in that the hydrogenation zone is at least partly outside the distillation zone.

The reintroduction level is usually located substantially below or substantially above or substantially at the same height as at least one removal level, preferably said removal level.

The charge supplying the distillation zone is introduced into said zone usually at least at a level of said zone, preferably mainly at only one level of said zone.

The distillation zone usually comprises at least one column equipped with at least one internal distillation member selected from the group formed by plates, loose linings and structured linings, as known to the skilled person, such that the total overall efficiency is usually at least equal to five theoretical stages. In instances known to the skilled person where the use of one single column creates problems it is generally preferable to divide up said zone in such a way as to use, in the end, at least two columns, which, placed end-to-end, form said zone, that is to say that the stripping zones, which may be in the form of a reaction zone and drainage zone, are divided over the columns. Usually, when the reaction zone is at least partly inside the distillation zone, the stripping zone or drainage zone, and preferably the drainage zone, can usually be found in at least one different column from the column comprising the inner part of the reaction zone.

The hydrogenation reaction zone usually comprises at least one hydrogenation catalytic bed, preferably from 2 to 4 catalytic bed(s); if at least two catalytic beds are incorporated into the distillation zone, these two beds may be separated by at least one internal distillation member. The hydrogenation reaction zone performs at least partial hydrogenation of the benzene present in the charge, usually in such a way that the benzene content in the effluent at the top is at the most equal to a given content, and said reaction zone performs at least partial hydrogenation, and preferably hydrogenation to a major extent, of any unsaturated compound comprising at the most six carbon atoms per molecule and which is different from the benzene which may be present in the charge.

The process according to the invention is such that the hydrogenation reaction zone is at least partly outside the distillation zone. Usually, the process according to the invention comprises between 1 and 6, preferably between 1 and 4 removal level(s) which supplies/supply the outer part of the hydrogenation zone. A part of the outer part of the hydrogenation zone which is supplied by a given removal level if the outer part of the hydrogenation zone comprises at least two removal levels usually comprises at least one reactor, preferably one single reactor. If said part of the outer part comprises at least two catalytic beds distributed in at least two reactors, said reactors are arranged in series or in parallel, and each of said reactors is preferably supplied by a removal level which is separate from the removal level which supplies the other reactor(s).

As for the process according to the invention, it is concerned with reactions which produce one (or more) reaction products with boiling points less than and/or almost identical to the boiling point of the reactants, and is concerned more particularly with the case of the hydrogenation of olefins having at the most six carbon atoms in their molecule and benzene in the light fraction of the reformate (see Table I below). In this cut, the olefins are usually branched (not straight) and the corresponding alkanes are lighter than said olefins. Benzene, another reactant in this cut, differs very little in respect of boiling temperature from the main product of its hydrogenation reaction, namely cyclohexane (difference in boiling temperature of 0.6° C.). Thus, under the conditions needed to ensure that the heavier products remain at the bottom of the column, the cyclohexane is usually divided between the effluents at the top and bottom of the column. Another product issuing from the hydrogenation reaction of the benzene is methylcyclohexane. This product is particularly favoured by hydrogenation catalysts with a high level of acidity. One of the catalysts which is particularly preferred according to the invention is platinum on chlorinated and/or fluorinated aluminium. This type of catalyst has a relatively high acidity level and therefore promotes the hydrogenation reaction with isomerisation of benzene into methylcyclohexane, which is characterised by a boiling point which is much less than that of benzene.

TABLE 1

| Compounds for hydrogenation and products | | Boiling temperature (°C.) | According to the invention, the compounds distil |
|---|---|---|---|
| 2-methyl 1-butene | (reactant) | 31.2 | at the top |
| 3-methyl 2-butene | (reactant) | 38.6 | at the top |
| 2-methylbutane | (product) | 27.8 | at the top |
| benzene | (reactant) | 80.1 | at the top |
| cyclohexane | (product) | 80.7 | at the top/at the bottom |
| methylcyclopentane | (product) | 71.8 | at the top |

The process according to the invention permits the hydrogenation of a large part of the compound(s) for hydrogenation outside the distillation zone, possibly under conditions of pressure and/or temperature different from that used in the column. Preferably, the temperature at the intake (respectively the temperature at the outlet) of a catalytic bed of the hydrogenation zone disposed outside the column is substantially the same, that is to say that the difference is substantially less than 10° C., than the temperature at the height of the removal level (respectively of the reintroduction level). The hydrogenation reaction is an exothermic reaction. In some instances, the amount of reactant for hydrogenation is considerable. In order to limit vaporisation of the effluents of this reaction, it is advantageously possible to carry out the hydrogenation reaction in the zone located outside the column at a greater pressure than that used inside the distillation zone. This increase in pressure also permits increased dissolution of the gaseous flow containing hydrogen in the liquid phase containing the compound(s) for hydrogenation.

The process according to the invention is such that the flow behaviour of the liquid for hydrogenation is usually co-current to the flow behaviour of the gaseous flow comprising the hydrogen, for any catalytic bed in the outer part the hydrogenation zone.

According to one of the preferred embodiments of the invention, the process according to the invention is such that the hydrogenation zone is incorporated both partly in the distillation zone, that is to say inside the distillation zone, and partly outside the distillation zone. According to an embodiment such as this, the hydrogenation zone comprises at least two, preferably at least three catalytic beds, at least one catalytic bed being inside the distillation zone, and at least one catalytic bed being outside the distillation zone. If the outer part of the hydrogenation zone comprises at least two catalytic beds, each catalytic bed is supplied by one single removal level, preferably associated with one single reintroduction level, said removal level being separate from the removal level which supplies the other catalytic bed(s). Usually, the liquid for hydrogenation, either partly or completely flows first of all in the outer part of the hydrogenation zone and then in the inner part of said hydrogenation zone. With respect to the part of the reaction zone inside the distillation zone, the liquid is removed naturally by flowing in the part of the reaction zone inside the distillation zone, and the liquid is reintroduced into the distillation zone naturally as well by the liquid flowing from the reaction zone inside the distillation zone. Moreover, the process according to the invention is preferably such that the flow behaviour of the liquid for hydrogenation is co-current or counter current, preferably co-current, to the flow behaviour of the gaseous flow comprising hydrogen, for any catalytic bed in the inner part of the hydrogenation zone, and still more preferably such that the flow behaviour of the liquid for hydrogenation is co-current to the flow behaviour of the gaseous flow comprising hydrogen and such that the vapour is separate from said liquid, for any catalytic bed in the inner part of the hydrogenation zone.

According to another preferred embodiment of the process according to the invention, independent of the previous embodiment, the hydrogenation zone is completely outside the distillation zone. It thus has the properties of the outer part of the hydrogenation zone of the previous embodiment.

In order to carry out hydrogenation according to the process of the invention, the theoretical molar ratio of hydrogen necessary to give the desired conversion of benzene is 3. The amount of hydrogen distributed upstream or in the hydrogenation zone may be excessive in relation to this stoichiometry, and this especially since in addition to the benzene present in the charge hydrogenation must be carried out at least partially of any unsaturated compound comprising at the most six carbon atoms per molecule and present in said charge. The excess hydrogen, if present, can advantageously be recovered, e.g. using one of the techniques to be described hereinafter. According to a first technique, the excess hydrogen issuing from the reaction zone is recovered, then compressed and reused in said reaction zone. According to a second technique, the excess hydrogen issuing from the reaction zone is recovered, then injected upstream of the compression stages associated with a catalytic reforming unit, mixing with the hydrogen coming from said unit, said unit preferably operating at low pressure, that is to say at a pressure which is usually less than 8 bar (1 bar=$10^5$ Pa).

The hydrogen contained in the gaseous flow which is used in the process of the invention for the hydrogenation of unsaturated compounds comprising at the most six carbon atoms per molecule can come from any source producing hydrogen of at least 50% by volume purity, preferably of at least 80% by volume purity, and still more preferably of at least 90% by volume purity. By way of example, hydrogen can be cited which comes from catalytic reforming processes, methanation, P.S.A. (=pressure swing adsorption), electrochemical generation or steam cracking.

One of the preferred embodiments of the process according to the invention which is independent or not of the previous embodiments is such that the effluent at the bottom of the distillation zone is mixed at least partly with the effluent at the top of said zone. The mixture thus obtained can, possibly after stabilisation, be used as fuel either directly or by incorporation into fuel fractions.

When the hydrogenation zone is at least partly incorporated into the distillation zone, the hydrogenation catalyst can be disposed in said incorporated part in accordance with the various technologies proposed in order to bring about catalytic distillation. They are mainly of two types.

According to the first type of technology, the reaction and distillation operations are carried out simultaneously in the same physical space, as taught, for example, in patent application WO-A-90/02.603, U.S. Pat. Nos. U.S. Pat. No. 4,471,154, U.S. Pat. No. 4,475,005, U.S. Pat. No. 4,215,011, U.S. Pat. No. 4,307,254, U.S. Pat. No. 4,336,407, U.S. Pat. No. 4,439,350, U.S. Pat. No. 5,189,001, U.S. Pat. No. 5,266,546, U.S. Pat. No. 5,073,236, U.S. Pat. No. 5,215,011, U.S. Pat. No. 5,275,790, U.S. Pat. No. 5,338,517, U.S. Pat. No. 5,308,592, U.S. Pat. No. 5,236,663, U.S. Pat. No.

5,338,518, and also in the patents EP-B1-0.008.860, EP-B1-0.448.884, EP-B1-0.396.650 and EP-B1-0.494.550 and patent application EP-A1-0.559.511. The catalyst is thus usually in contact with a descending liquid phase generated by the reflux introduced at the top of the distillation zone, and with an ascending vapour phase generated by the reboiling vapour introduced at the bottom of the zone. According to this type of technology, the gaseous flow comprising the hydrogen needed for the reaction zone, for carrying out the process of the invention, could be joined to the vapour phase, substantially at the intake for at least one catalytic bed of the reaction zone.

According to the second type of technology, the catalyst is disposed in such a way that the reaction and distillation operations usually take place independently and consecutively, as taught in U.S. Pat. No. 4,847,430, U.S. Pat. No. 5,130,102 and U.S. Pat. No. 5,368,691, for example, the vapour from the distillation zone virtually not passing through any catalytic bed in the reaction zone. Thus, if this type of technology is used, the process according to the invention is usually such that the flow behaviour of the liquid for hydrogenation is co-current to the flow behaviour of the gaseous flow comprising hydrogen and such that the distillation vapour is virtually not in contact with the catalyst (which is usually manifested by the fact that said vapour is separated from said liquid for hydrogenation), for any catalytic bed in the inner part of the hydrogenation zone. Such systems usually comprise at least one device for dispensing liquid which may, for example, be a liquid dispenser, in any catalytic bed of the reaction zone. Nonetheless, since these technologies have been conceived for catalytic reactions between liquid reactants, they can only be suitable for a hydrogenation catalytic reaction if modified, wherein one of the reactants, namely hydrogen, is in the gaseous state. For any catalytic bed in the inner part of the hydrogenation zone, it is therefore usually necessary to join a device for the distribution of the gaseous flow containing hydrogen, e.g. in accordance with one of the three techniques to be described hereinafter. Thus, the part inside the hydrogenation zone comprises at least one device for dispensing liquid and at least one device for dispensing the gaseous flow containing hydrogen, in any catalytic bed in the part inside the hydrogenation zone. According to a first technique, the device for dispensing the gaseous flow containing the hydrogen is disposed upstream of the device for dispensing liquid, and is thus disposed upstream of the catalytic bed. According to a second technique, the device for dispensing the gaseous flow containing the hydrogen is disposed at the level of the device for dispensing liquid, in such a way that the gaseous flow containing the hydrogen is introduced into the liquid upstream of the catalytic bed. According to a third technique, the device for dispensing the gaseous flow containing hydrogen is disposed downstream of the device for dispensing liquid, and therefore within the catalytic bed, preferably not far from said device for dispensing liquid in said catalytic bed. The terms, "upstream" and "downstream" which have been used hereinabove are to be understood in relation to the direction of flow of the liquid which will pass through the catalytic bed.

One of the preferred realisations of the process according to the invention is such that the catalyst of the inner part of the hydrogenation zone is disposed in the reaction zone in accordance with the basic device described in the patent U.S. Pat. No. 5,368,691, arranged in such a way that any catalytic bed of the inner part of the hydrogenation zone is supplied with a gaseous flow containing hydrogen, uniformly dispensed at the bottom thereof, e.g. in accordance with one of the three techniques described hereinabove. In accordance with this technology, if the distillation zone comprises only one column and if the hydrogenation zone is completely inside said column the catalyst contained in any catalytic bed inside the distillation zone is thus in contact with an ascending liquid phase which has been generated by the reflux introduced at the top of the distillation column, and with the gaseous flow comprising hydrogen which circulates in the same direction as the liquid; contact with the vapour phase of the distillation operation is avoided by causing this latter to move through at least one specially arranged stack.

When the hydrogenation zone is at least partly inside the distillation zone, the operating conditions of the part of the hydrogenation zone inside the distillation zone are linked to the operating conditions for the distillation operation. Distillation can be carried out, for example, in such a way that the basic product thereof contains the major part of the cyclohexane and of the isoparaffins with 7 carbon atoms of the charge, as well as the cyclohexane formed by hydrogenation of the benzene. It is carried out at a pressure which is usually between 2 and 20 bar, preferably between 4 and 10 bar (1 bar=$10^5$ Pa), with a reflux ratio of between 1 and 10, and preferably of between 3 and 6. The temperature at the top of the zone is usually between 40° and 180° C., and the temperature at the bottom of the zone is usually between 120° and 280° C. The hydrogenation reaction is carried out under conditions which are most frequently intermediate between those prevailing at the top and bottom of the distillation zone, at a temperature of between 100° and 200° C., and preferably of between 120° and 180° C., and at a pressure of between 2 and 20 bar, preferably of between 4 and 10 bar. The liquid which has been subjected to hydrogenation is supplied by a gaseous flow containing hydrogen, the throughput thereof being dependent on the concentration of benzene in said liquid, and, more generally, on the unsaturated compounds which comprise at the most six carbon atoms per molecule of charge in the distillation zone. It is usually at least equal to the throughput in accordance with the stoichiometry of the hydrogenation reactions involved (hydrogenation of benzene and of other unsaturated compounds comprising at the most six carbon atoms per molecule, contained in the hydrogenation charge), and at the most equal to the throughput corresponding to 10 times the stoichiometry, preferably to between 1 and 6 times the stoichiometry, and even more preferably to between 1 and 3 times the stoichiometry.

In the outer part of the hydrogenation zone, the catalyst is disposed in any catalytic bed in accordance with any technology known to the skilled person under operating conditions (temperature, pressure . . . ) which may be independent or otherwise, and which are preferably independent, of the operating conditions of the distillation zone.

In the part of the hydrogenation zone outside the distillation zone, the operating conditions are usually as follows. The pressure required for this hydrogenation stage is usually between 1 and 60 bars absolute, preferably between 2 and 50 bar, and still more preferably between 5 and 35 bar. The operating temperature of the hydrogenation zone is usually between 100° and 400° C., preferably between 120° and 350° C., and still more preferably between 140° and 320° C. The space velocity within said hydrogenation zone, calculated in relation to the catalyst, is usually between 1 and 50, and more particularly between 1 and 30 $h^{-1}$ (volume of charge per volume of catalyst and per hour). The throughput of hydrogen in accordance with the stoichiometry of the hydrogenation reactions involved is between 0.5 and 10 times said stoichiometry, preferably between 1 and 6 times said stoichiometry, and still more preferably between 1 and 3 times said stoichiometry. However, the temperature and pressure conditions within the scope of the present invention can also be between those prevailing at the top and bottom of the distillation zone.

More generally speaking, irrespective of the position of the hydrogenation zone in relation to the distillation zone, the catalyst used in the hydrogenation zone according to the process of the present invention usually comprises at least one metal selected from the group formed by nickel and platinum, used as it is or preferably deposited on a support. The metal must usually be in reduced form for at least 50% by weight of its total. However, any other hydrogenation catalyst known to the skilled person can also be selected.

When platinum is used, the catalyst can advantageously contain at least one halogen in a proportion by weight in relation to the catalyst of between 0.2 and 2%. Preferably, chlorine or fluoride or a combination of the two is used in a proportion in relation to the total weight of catalyst of between 0.2 and 1.5%. If a catalyst is used which contains platinum, a catalyst is usually used such that the average size of the platinum crystallites is less than $60.10^{-10}$, preferably less than $20.10^{-1}$ m, and still more preferably less than $10.10^{-10}$ m. Moreover, the total amount of platinum in relation to the total weight of catalyst is generally between 0.1 and 1%, and preferably between 0.1 and 0.6%.

If nickel is used, the amount of nickel in relation to the total weight of catalyst is between 5 and 70%, more particularly between 10 and 70%, and preferably between 15 and 65%. Moreover, a catalyst is usually used such that the average size of the nickel crystallites is less than $100.10^{-10}$ m, preferably less than $80.10^{-10}$, and still more preferably less than $60.10^{-10}$ m.

The support is usually selected from the group formed by alumina, silica-aluminas, silica, zeolites, active carbon, clays, aluminous cements, oxides of rare earth metals and alkaline-earth oxides, on their own or mixed. It is preferable to use an alumina- or silica-based support with a specific surface area of between 30 and 300 $m^2/g$, preferably of between 90 and 260 $m^2/g$.

DETAILED DESCRIPTION OF THE DRAWINGS

Figure 1:
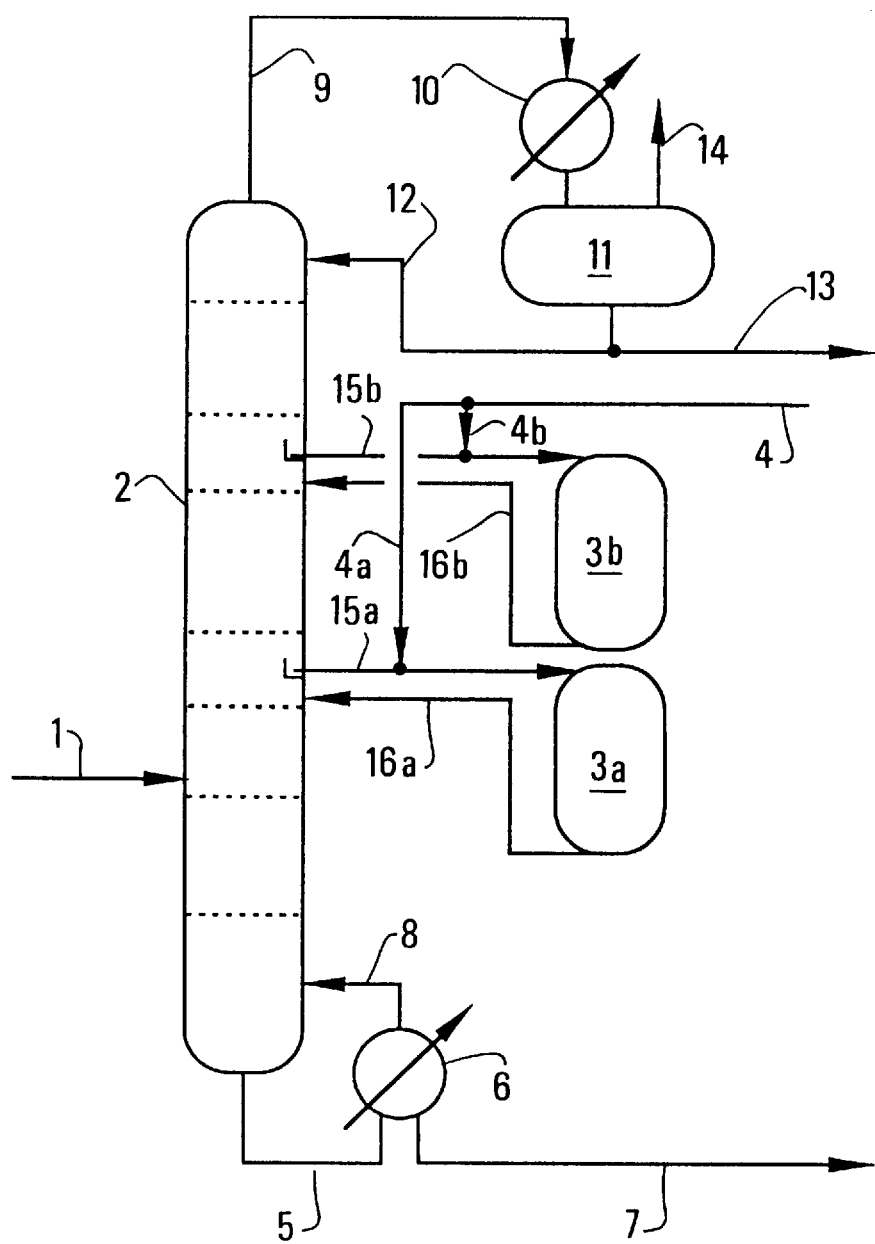
FIGS. 1 and 2 each illustrate a possible realisation of the process according to the invention. Devices which are similar are indicated by the same reference numerals in all the drawings. The detailed structure of a catalytic cell as well as its arrangement in the column are illustrated in FIG. 3.

A first realisation of the process is shown in FIG. 1. The crude $C_5^+$ reformate which usually contains small amounts of $C_4^-$ hydrocarbons is sent to a column 2 via line 1. Said column contains internal distillation members, which in the case shown in FIG. 1, may be in the form of plates or linings and are shown in part by dotted lines in that drawing.

At the foot of the column, the least volatile fraction of the reformate which is constituted mainly by hydrocarbons with 7 or more carbon atoms is recovered via line 5, reboiled in the exchanger 6, and removed via line 7. The reboiling vapour is reintroduced into the column via line 8. At the top of the column, the vapour of light hydrocarbons, that is to say comprising mainly 6 or less carbon atoms per molecule, is sent via line 9 into a condenser 10 and then into a spherical flask 11 where a liquid phase is separated from a vapour phase constituted mainly by the hydrogen which may be excessive. The vapour phase is removed from the spherical flask via line 14. The liquid phase of the spherical flask 11 is sent partly via line 12 at the top of the column to ensure reflux, whilst the other part constitutes the liquid distillate which is removed via line 13.

Using a removal plate placed in the stripping zone of the column, a liquid is drawn off via line 15a which is sent to the top of a hydrogenation reactor 3a, after hydrogen has been added via lines 4 and then 4a. The effluent of the hydrogenation reactor is recycled to the column via line 16a which is here optionally shown under removal line 15a.

Likewise, a liquid is drawn off via line 15b which is sent to the hydrogenation reactor 3b, after hydrogen has been added via lines 4 and 4b, and the effluent of the hydrogenation reactor is recycled to the column via line 16b (optionally shown under removal line 15b).

Figure 2:
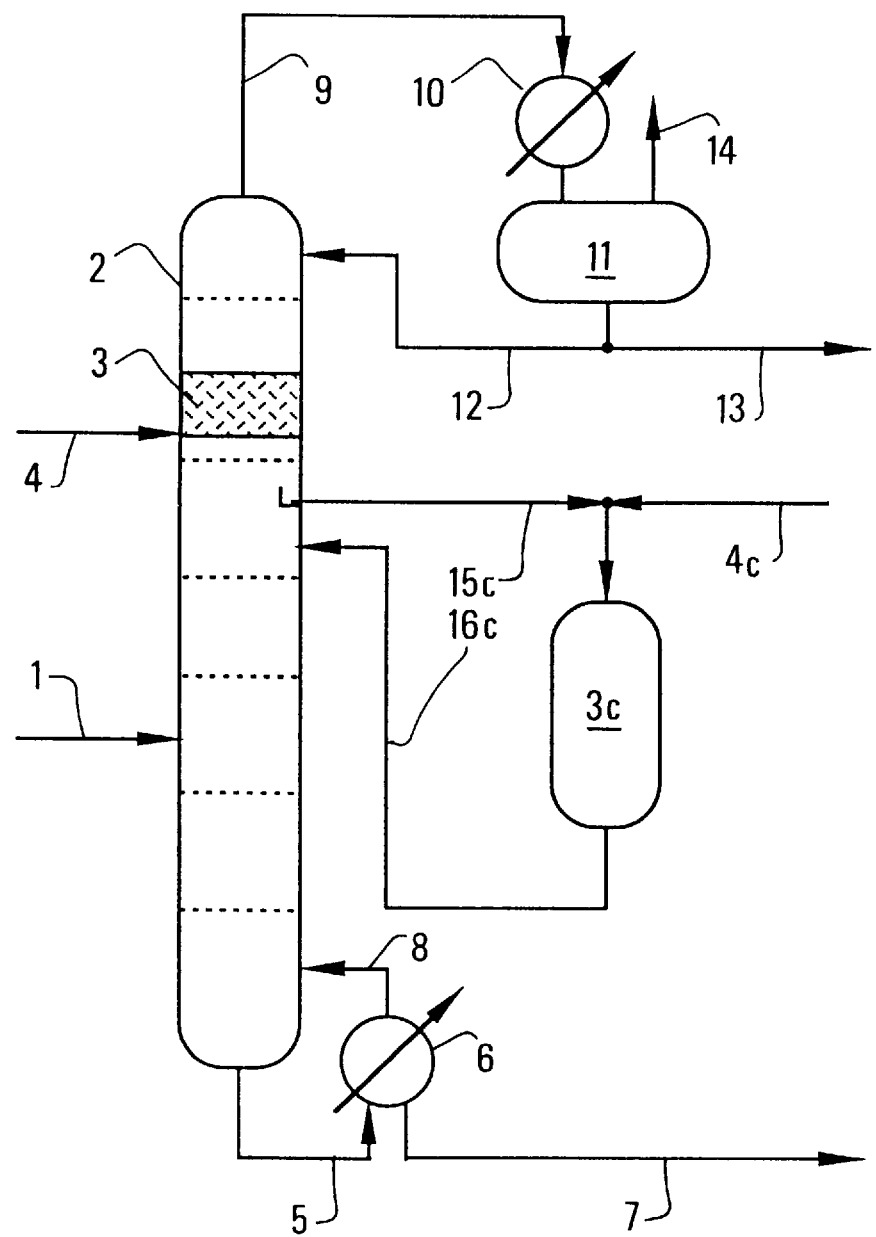

According to a second embodiment of the process, shown in FIG. 2, the crude $C_5^+$ reformate which usually contains small amounts of $C_4^-$ hydrocarbons is sent via line 1 to a distillation column 2 which is equipped with internal distillation members, which, in the case of FIG. 2, are distillation plates, as well as being equipped with an internal catalytic member 3 which contains a hydrogenation catalyst and which is supplied with hydrogen via line 4.

The effluents at the top and bottom of the column are treated in the way described hereinabove for the first realisation of the process. From a removal plate placed in the stripping zone of the column, a liquid is removed via line 15c, which, after hydrogen has been added via line 4c, is introduced into the hydrogenation reactor 3c. The effluent of the hydrogenation reactor is recycled to the distillation column via line 16c, at a level which is shown optionally under the level for drawing off liquid.

EXAMPLES

The following examples illustrate the invention.

Example 1

(Comparative)

A metal distillation column is used of diameter 50 mm, which has been rendered adiabatic by heating casings with temperatures controlled in such a way as to reproduce the temperature gradient which prevails in the column. Over a height of 4.5 m, the column comprises from the top to the bottom: a stripping zone composed of 11 plates which are apertured with outlets and descending inclines, a hydrogenating catalytic distillation zone and a drainage zone composed of 63 apertured plates. The hydrogenating catalytic distillation zone is constituted by three reactive plates, which, in this example, are apertured distillation plates with outlets and descending inclines, the outlets of which are raised by 3.5 cm and the volume of which between the level of the top of the outlet, and the plate can be lined with catalyst. A metal grid placed at the top of the outlet acts as a filter to prevent particles of catalyst from being removed with the liquid leaving the plate.

Each of the three cells is lined with 36 g of nickel catalyst sold by the company PROCATALYSE under reference LD 746. 260 g/h of a reformate constituted mainly by hydrocarbons with at least 5 carbon atoms per molecule is introduced onto the 37th plate of the column, starting from the bottom, the composition of which reformate is shown in Table I. At the bottom of each cell a throughput of 18 Nl/h hydrogen is also introduced. The column is regulated by establishing a reflux ratio of 5 and by controlling the base temperature to 195° C. and the absolute pressure to 7 bar.

Under stable conditions, a residue and a liquid distillate are recovered at throughputs of 138 g/h and 113 g/h respectively, the compositions of which are given in Table I. A small part of the distillate which is constituted by the lightest hydrocarbons is removed from the column with the excess hydrogen and is not replenished. Analyses made of the effluents reveal that the hydrogenation rates of the olefins and of the benzene of the charge are respectively 100 and 55%, whereas the toluene was not affected.

Example 2

(Comparative)

The same apparatus is used as that described in Example 1, but with a different design of catalytic distillation zone. The hydrogenating catalytic distillation zone is here constituted by three reactive distillation pairs, each pair itself being constituted by a catalytic cell surmounted by three apertured plates. The detailed structure of a catalytic cell as well as its arrangement in the column are illustrated in FIG. 3. The catalytic cell 41 consists of a flat-bottomed cylindrical container of an external diameter which is less by 2 mm than the internal diameter of the column. It is equipped at the bottom part thereof, above the base, with a grid 42 which acts both as a support for the catalyst and as a dispenser for the hydrogen, and, at the top part, it is equipped with a grid for retaining the catalyst 43, the height of which can be varied. The catalyst 44 fills the entire volume between the two grids. The catalytic cell receives the liquid coming from the upper distillation plate 45, via the descending incline 46. After having passed through the cell in the ascending direction, the liquid is removed by flowing over the descending incline 47, and flows on the lower distillation plate 48. The vapour issuing from the lower plate 48 takes the central stack 49 which is fixed to the cell, penetrating through the orifices 50 (only one appears in the drawing) and reemerges under the upper plate 45 through orifices 51 (only one appears in the drawings). The hydrogen is introduced at the foot of the catalytic cell through the tubing 52, then via the orifices 53 (six in total) distributed over the periphery of the cell, in the immediate vicinity of the base. Sealing joints 54 prevent any hydrogen from escaping before it arrives on the catalytic bed.

Each of the three cells is lined with 36 g catalyst with nickel sold by the company PROCATALYSE under the reference LD 746. On the 37th plate of the column, starting from the bottom, 260 g/h of the same charge is introduced as that used in Example 1, and the composition of which is given in the second column of the table. A throughput of 6 Nl/h hydrogen is also introduced at the base of each cell. The column is controlled by establishing a reflux ratio of 5 and by controlling the base temperature to 176° C. and the pressure to 7 bar.

Under stable conditions, a residue and a liquid distillate are recovered at respective rates of 143 g/h and 106 g/h, the compositions of which residue and liquid distillate are given in Table 2. A small part of the distillate which is constituted by the lightest hydrocarbons is removed from the column with the excessive hydrogen and is not replenished. Analyses made of the effluents reveal respective hydrogenation rates of olefins and benzene in the charge of 100 and 87%, whereas toluene is unaffected.

TABLE 2 compositions of the charge and of the effluents of the catalytic column

Compositions, in % by weight

| | | Example 1 | | Example 2 | |
|---|---|---|---|---|---|
| | Charge | Residue | Distillation Liquor | Residue | Distillation Liquor |
| C5 and lighter | 7.65 | | 10.22 | | 7.36 |
| of which: olefins | 0.11 | | 0 | | 0 |
| C6 | 44.83 | 9.55 | 89.78 | 12.4 | 92.59 |
| of which: | | | | | |
| olefins | 0.13 | | 0 | | 0 |
| benzene | 6.07 | 0.63 | 5.45 | 0.07 | 1.84 |
| cyclohexane | 1.1 | 8.34 | 0.34 | 12.16 | 0.73 |
| C7: | 42.55 | 80.72 | | 78.27 | 0.05 |
| of which: toluene | 4.78 | 9.1 | | 8.87 | |
| C8 and heavier | 4.97 | 9.73 | | 9.33 | |
| Conversion of olefins | | 100% | | 100% | |
| Conversion of benzene | | 55% | | 87% | |
| Conversion of hydrogen | | 15% | | 70% | |

It is noted that the process according to Example 2 permits better conversion of benzene and better conversion of hydrogen in comparison with the first example. Nonetheless, the utilisation rate of hydrogen can be greatly improved.

Example 3

In order to demonstrate the operation of a fixed bed reactor which can be used according to the invention, a tubular reactor of internal diameter 2 cm is charged with 36 g catalyst pre-reduced with platinum on a support of chlorinated alumina sold by the company PROCATALYSE under reference LD412. A synthetic charge was prepared in order to simulate the liquid phase for hydrogenation taken off from the 37th plate of a column operating under the same conditions and with the same charge as in Examples 1 and 2. The throughput of charge conveyed to the bottom of the reactor is 0.3 l/h at a temperature of 141° C. The catalyst is activated in the presence of a 60 l/h flow of hydrogen for 2 hours at 150° C., and the unit is then purged in the presence of nitrogen before the charge is conveyed to the unit. The molar ratio of hydrogen/benzene is 3.3. The reactor operates at a pressure of 25 bars.

It is noted (see Table 3) that the hydrogenation of the benzene and of the olefins in the charge is virtually complete. Moreover, the excess hydrogen needed to promote the conversion of unsaturated compounds is low, which permits good utilisation of the hydrogen. It is also noted that a certain amount of benzene is converted into methyl cyclopentane. This fact is of particular interest as far as the production of car fuel is concerned because the octane number of methylcyclopentane is higher than that of cyclohexane.

Example 4

The same procedure exactly is followed as in Example 3, except that 36 g catalyst pre-reduced with nickel is used, as sold by the company PROCATALYSE under reference LD746. The catalyst is activated in the presence of a 60 l/h flow of nitrogen for 16 hours at 180° C. before the charge is sent to the unit.

The results given in Table 3 show that the catalyst is almost at the same level of activity as D412 for the hydrogenation of benzene. On the other hand, the LD746 does not promote the formation of methylcyclopentane.

TABLE 3

Composition of the charge and of the effluents for Examples 3 and 4.
Composition in % by weight

| | Charge | Effluent of Example 3 | Effluent of Example 4 |
|---|---|---|---|
| 2-methyl 1-butene | 0.2 | 0 | 0 |
| 2-methylbutene | 0 | 0.1 | 0.1 |
| 2-methyl 1-pentene | 0.2 | 0 | 0 |
| 2-methylpentane | 0 | 0.4 | 0.2 |
| n-pentane | 10.0 | 9.9 | 10.0 |
| n-hexane | 81.7 | 81.1 | 81.7 |
| methylcyclopentane | 0 | 1.4 | 0 |
| benzene | 7.8 | 0.0 | 0.1 |
| cyclohexane | 0 | 6.4 | 7.7 |
| other | 0.1 | 0.7 | 0.2 |
| Conversion of olefins | | 100% | 100% |
| Conversion of benzene | | 100% | 99% |
| Conversion of hydrogen | | 92% | 91% |

Example 5

(Comparative)

The performances of the process according to Example 2 are then revealed with an industrial charge of reformate. Realisation of the process is simulated for a throughput of 312.23 kmol/h of reformate of the composition given in Table 4. The column is composed of 30 theoretical plates, and the positions numbered from the top to the bottom are as follows: injection of the charge (plate 16), catalytic pairs (plates 6, 8 and 10). Each pair which operates in liquid phase and with ascending flow behaviour is charged with 3775 kg catalyst with nickel sold by the company PROCATALYSE under reference LD746. The hydrogen/benzene molar ratio is 6, each catalytic pair is supplied with one third of the hydrogen. The pressure in the reflux spherical flask is 6.5 bar, the reflux temperature is 40° C. The temperature of the liquid prior to mixing with hydrogen is between 120° and 130° C., and that of the hydrogen is 40° C. The reflux/charge ratio by weight is 2.23. The compositions of the fractions of light reformate, purge vapour and heavy reformate are given in Table 4.

Example 6

(According to the Invention)

The same catalyst, the same charge and the same column are used as described in Example 5, but the hydrogenation reactors are located outside the distillation column. The unit is therefore shown in FIG. 1 apart from a third reactor (3c) not shown. The charge for the column is injected via line 1 at plate 16. The charges for the three reactors 3a, 3b and 3c are drawn off from plates 6, 8 and 10 respectively via lines 15a, 15b and 15c. They receive hydrogen via lines 4a, 4b and 4c before entering the reactors operating with descending flow behaviour and at a pressure of 20 bar. Each reactor is charged with 3775 kg of catalyst LD746. The hydrogen/benzene molar ratio is 3.3, each catalytic pair is supplied by this stoichiometry. The effluents of the reactors 3a, 3b and 3c are re-injected into the column via lines 16a, 16b and 16c at the plates 5, 7 and 9 respectively. All the other conditions are identical to those given in Example 5. The simulated compositions of light reformate fractions (13), purge vapour (14) and heavy reformate (7) are given in Table 5.

It is noted that in comparison with processes where the hydrogenation zones are inside the column the process according to the present invention where at least one of the reactors for the hydrogenation of benzene and the olefinic compounds in the charge is located outside the distillation zone permits a reduction in the amount of hydrogen (−45%) needed to obtain the same conversion rate of benzene (−45%), and permits an increase in the yield of light reformate (+11%) and a great reduction in the amount of non-condensed gas (−85%).

TABLE 4

Composition of the charge and of the effluents for Example 5.

| Body/Kmoles/h | charge | H2 | Light Reformate | Purge Vapour | Heavy Reformate |
|---|---|---|---|---|---|
| H2 | | 117.07 | 0.54 | 61.62 | 0.00 |
| butanes | 17.20 | | 12.07 | 5.13 | 0.00 |
| iso pentanes | 15.14 | | 13.14 | 2.33 | 0.00 |
| normal pentanes | 24.61 | | 21.74 | 2.87 | 0.00 |
| pentenes | 0.33 | | 0.00 | 0.00 | 0.00 |
| dimethylbutanes | 24.24 | | 21.85 | 2.39 | 0.00 |
| methylcyclopentane | 26.24 | | 25.10 | 1.33 | 0.03 |
| hexenes | 0.22 | | 0.00 | 0.00 | 0.00 |
| hexanes | 16.15 | | 15.00 | 0.63 | 0.52 |
| Cyclohexane | 0.00 | | 1.00 | 0.03 | 17.09 |
| Benzene | 19.42 | | 0.09 | 0.00 | 1.21 |
| C7 Paraffins | 21.39 | | 0.02 | 0.00 | 21.37 |
| methylcyclohexane | 0 | | 0.00 | 0.00 | 0.00 |
| Toluene | 40.72 | | 0.00 | 0.00 | 40.72 |
| C8 Paraffins | 1.37 | | 0.00 | 0.00 | 1.37 |
| C8 Aromatics | 46.20 | | 0.00 | 0.00 | 46.20 |
| C9 Compounds | 24.98 | | 0.00 | 0.00 | 24.98 |
| C10+ Compounds | 34.02 | | 0.00 | 0.00 | 34.02 |

TABLE 5

Composition of the charge and of the effluents for Example 6.

| Body/Kmoles/h | Charge | H2 | Light Reformate | Purge Vapour | Heavy Reformate |
|---|---|---|---|---|---|
| H2 | | 64.64 | 0.59 | 9.14 | 0.00 |
| butanes | 17.20 | | 16.26 | 0.94 | 0.00 |
| iso pentanes | 15.14 | | 15.10 | 0.37 | 0.00 |
| normal pentanes | 24.61 | | 24.18 | 0.43 | 0.00 |
| pentenes | 0.33 | | 0.00 | 0.00 | 0.00 |
| dimethylbutanes | 24.24 | | 23.90 | 0.34 | 0.00 |
| methylcyclopentane | 26.24 | | 26.20 | 0.23 | 0.03 |
| hexenes | 0.22 | | 0.00 | 0.00 | 0.00 |
| hexanes | 16.15 | | 15.54 | 0.09 | 0.52 |
| Cyclohexane | 0.00 | | 1.03 | 0.00 | 17.09 |
| Benzene | 19.42 | | 0.09 | 0.00 | 1.21 |
| C7 Paraffins | 21.39 | | 0.02 | 0.00 | 21.37 |
| methylcyclohexane | 0 | | 0.00 | 0.00 | 0.00 |
| Toluene | 40.72 | | 0.00 | 0.00 | 40.72 |
| C8 Paraffins | 1.37 | | 0.00 | 0.00 | 1.37 |
| C8 Aromatics | 46.20 | | 0.00 | 0.00 | 46.20 |
| C9 Compounds | 24.98 | | 0.00 | 0.00 | 24.98 |
| C10+ Compounds | 34.02 | | 0.00 | 0.00 | 34.02 |

We claim:

1. A process for treating a charge of which the major part is constituted by hydrocarbons comprising at least 5 carbon atoms per molecule and containing at least one unsaturated compound comprising at the most six carbon atoms per molecule including benzene, wherein said charge is treated in a distillation zone, comprising a drainage zone and a stripping zone, connected to a hydrogenation reaction zone, comprising at least one catalytic bed, in which the hydrogenation takes place of at least part of the unsaturated compounds, comprising at the most six carbon atoms per molecule contained in the charge, in the presence of a hydrogenation catalyst and a gaseous flow containing hydrogen, in such a way that the effluent from the top of the distillation zone has a depleted content of unsaturated compound comprising at the most six carbon atoms per molecule and the effluent at the bottom of the distillation zone has a depleted content of unsaturated compounds comprising at the most six carbon atoms per molecule, said process being characterised in that the hydrogenation zone is at least partly outside the distillation zone, the charge to the hydrogenation reaction zone being removed at the height of a removal level and representing at least part of the liquid flowing in the stripping zone, the effluent of the hydrogenation reaction zone being at least in part reintroduced into the distillation zone at the height of at least one reintroduction level, in such a way as to ensure continuity of the distillation.

2. A process according to claim 1 comprising between 1 and 6 removal level(s).

3. A process according to either claim 1 comprising between 1 and 4 removal level(s).

4. A process according to claim 1, such that distillation is carried out at a pressure of between 2 and 20 bar, with a reflux ratio of between 1 and 10, for the effluent from the top of the distillation zone, the temperature at the top of the distillation zone being between 40° and 180° C. and the temperature at the bottom of the distillation zone being between 120° and 280°.

5. A process according to claim 1, wherein the hydrogenation reaction zone is completely outside the distillation zone.

6. A process according to claim 1, wherein the hydrogenation zone is incorporated both partly inside the stripping zone of the distillation zone and partly outside the distillation zone.

7. A process according to claim 6, wherein any part of the hydrogenation reaction inside the distillation zone, is carried out at a temperature of between 100° and 200° C., at a pressure of between 2 and 20 bar, and throughput of the hydrogen supplying the hydrogenation zone is between one and 10 times the throughput corresponding to the stoichiometry of the hydrogenation of benzene with other unsaturated compounds present.

8. A process according to claim 1, wherein for the hydrogenation reaction performed outside the distillation zone, the pressure is between 1 and 60 bar, the temperature is between 100° and 400° C., the space velocity inside the hydrogenation zone, calculated in relation to the catalyst, is between 1 and 50 volume of charge per volume of catalyst per hour, and the hydrogen throughput corresponding to the stoichiometry of the hydrogenation of benzene and other unsaturated compounds present is between 0.5 and 10 times said stoichiometry.

9. A process according to claim 6, such that any catalytic bed in the internal part of the hydrogenation zone the hydrogenation catalyst is in contact with a descending liquid phase and with an ascending vapour phase.

10. A process according to claim 9, such that the gaseous flow containing hydrogen needed for the hydrogenation reaction is joined with the ascending vapour phase at the intake of at least one catalytic bed of the hydrogenation zone.

11. A process according to claim 6, such that with respect to any catalytic bed in the inner part of the hydrogenation zone, the flow behaviour of the liquid for hydrogenation is co-current to the flow behaviour of the gaseous flow comprising hydrogen.

12. A process according to claim 6, such that the flow behaviour of the liquid for hydrogenation is co-current to the flow behaviour of the gaseous flow comprising hydrogen, and such that with respect to any catalytic bed in the inner part of the hydrogenation zone, the distillation vapour is substantially not in contact with the catalyst.

13. A process according to claim 12, such that the hydrogenation zone comprises at least one liquid dispensing device in any catalytic bed of said zone and at least one device for dispensing the gaseous flow comprising hydrogen in any catalytic bed of the hydrogenation zone inside said zone.

14. A process according to claim 13, such that the device for dispensing the gaseous flow comprising hydrogen is disposed upstream of the liquid dispensing device.

15. A process according to claim 13, such that the device for dispensing gaseous flow comprising hydrogen is disposed at the level of the liquid dispensing device.

16. A process according to claim 13, such that the device for dispensing the gaseous flow comprising hydrogen is disposed downstream of the liquid dispensing device.

17. A process according to claim 1, such that the hydrogenation zone catalyst comprises at least one metal selected from the group formed by nickel and platinum.

18. A process according to claim 1, such that the hydrogenation zone catalyst comprises a support.

19. A process according to claim 1, such that any hydrogen excess issuing from the top of the reaction zone is recovered, then compressed and returned to said reaction zone.

20. A process according to claim 1, such that any hydrogen excess issuing from the top of the reaction zone is recovered, injected upstream of compression stages associated with a catalytic reforming unit, and mixed with the hydrogen coming from said catalytic reforming unit.

21. A process according to claim 20, such that said catalytic reforming unit operates at a pressure of less than about 8 bars.

22. A process according to claim 1, such that the charge comprises at least one olefin comprising at the most six carbon atoms per molecule.

23. A process according to claim 1, wherein methylcyclopentane is produced in the effluent of the hydrogenation reaction zone.

* * * * *